(12) United States Patent
Hung et al.

(10) Patent No.: US 7,945,642 B1
(45) Date of Patent: May 17, 2011

(54) METHOD AND SYSTEM FOR PROVIDING SOFTWARE TO A MACHINE

(75) Inventors: Yat-Sang Hung, San Diego, CA (US); Pierre Barbeau, Leawood, KS (US); Mary Nick-Baustert, Olathe, KS (US); Jason Whitney, Lees Summit, MO (US); Michael T. Lundy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1425 days.

(21) Appl. No.: 11/244,466

(22) Filed: Oct. 6, 2005

(51) Int. Cl.
*G06F 15/16* (2006.01)
(52) U.S. Cl. ...................................................... 709/219
(58) Field of Classification Search .................... 709/219
See application file for complete search history.

(56) References Cited

U.S. PATENT DOCUMENTS

| | | | | |
|---|---|---|---|---|
| 6,694,354 | B1* | 2/2004 | Elg | 709/217 |
| 6,766,373 | B1* | 7/2004 | Beadle et al. | 709/227 |
| 7,200,390 | B1* | 4/2007 | Henager et al. | 455/419 |
| 7,343,568 | B2* | 3/2008 | Jiang et al. | 715/854 |
| 2002/0083228 | A1* | 6/2002 | Chiloyan et al. | 710/9 |
| 2004/0045000 | A1* | 3/2004 | Hara | 717/178 |
| 2006/0122848 | A1* | 6/2006 | Takagi | 705/1 |
| 2006/0248524 | A1* | 11/2006 | Seely | 717/174 |

OTHER PUBLICATIONS

U.S. Appl. No. 11/244,625, filed Oct. 6, 2005 entitled Method and System for Automated Download of Program Logic to a Machine.
Office Action from U.S. Appl. No. 11/244,625, dated Sep. 30, 2008.
Office Action from U.S. Appl. No. 11/244,625, dated Apr. 10, 2009.
Office Action from U.S. Appl. No. 11/244,625, dated Jun. 10, 2009.
Office Action from U.S. Appl. No. 11/244,625, dated Sep. 11, 2009.
Office Action from U.S. Appl. No. 11/244,625, dated Mar. 10, 2010.

* cited by examiner

*Primary Examiner* — George C Neurauter, Jr.
*Assistant Examiner* — Suraj Joshi

(57) ABSTRACT

A method and system for triggering installation of program logic on a machine, such as a PC. A server transmits installation-trigger logic to a wireless communication device (WCD), which the WCD stores in its data storage. When the WCD becomes connected with a PC, the PC views the WCD as a mass-storage drive, and the PC reads and executes the installation-trigger logic in the same manner that a PC would run an AUTORUN file on a conventional mass-storage drive. Per the installation-trigger logic, the PC then downloads and installs a designated software program. The PC then sends an installation-notice to the server, and the server responsively sends a cancellation-message to the WCD. In response to the cancellation-message, the WCD then deletes or otherwise disables the installation-trigger logic, so that the process will not be repeated the next time the WCD is connected with the PC.

18 Claims, 6 Drawing Sheets

METHOD AND SYSTEM FOR PROVIDING SOFTWARE TO A MACHINE

FIELD OF THE INVENTION

The present invention relates to software installation and, more particularly, to triggering of such installation.

DESCRIPTION OF RELATED ART

The art and popularity of wireless communication devices has grown significantly over recent years. Indeed, millions of people are engaging in voice and data communications over wireless communication devices such as cellular telephones and Personal Digital Assistants (PDAs). In principle, a user can communicate over the Internet or call anyone over the Public Switched Telephone Network (PSTN) from any place inside the coverage area of a cellular wireless network.

At the same time, the use of personal computers and other sorts of programmable communication devices has also increased significantly over recent years. With the widespread use of the Internet and availability of broadband communications, for instance, personal computers now provide quick and easy access to a virtually unlimited amount of information. Further, the software available for use on personal computers has continued to grow as well, allowing personal computers and personal computer users to engage in an ever-increasing number of useful functions.

In certain cases, a new personal computer will come preloaded with various software applications. In most other cases, however, a personal computer user will need to acquire software and install the software on the personal computer. In typical practice, a user can acquire software by downloading the software over the Internet or by purchasing the software at a physical retail establishment. Most such software will come with an installation program, which the user can direct the personal computer to execute, in order to install the software on the computer.

SUMMARY

The present invention provides a mechanism to trigger installation of program logic onto a machine, such as a personal computer (PC), a television, a set-top-box, or an appliance, for instance. In accordance with an exemplary embodiment, a set of installation-trigger logic will be delivered from a network server to a wireless communication device or will otherwise be provided on the wireless communication device. When the wireless device will then be connected to a machine such as a PC, and the machine will execute the installation-trigger logic. Pursuant to the installation-trigger logic, the machine will then download from a designated network site a particular software program and will install the program. Alternatively, the machine will determine that it already has the software program installed.

The machine will then notify the network server that the software has been installed (or the machine's request to download the software may constitute such a notification). In response, the network server will then send a cancellation message to the wireless communication device to cause the wireless communication device to erase or otherwise disable the installation-trigger logic, so that the next time the wireless communication device is connected to the machine, the process will not then repeat. Upon receipt of the cancellation message, the wireless device will then automatically delete or otherwise disable the installation-trigger logic accordingly.

In a preferred embodiment, the installation-trigger logic will be stored on the wireless communication device in the same manner that auto-execute logic is stored on a mass-storage device, and the wireless communication device will then function in effect as a mass-storage device when coupled with the machine. Thus, just as a PC may automatically execute designated logic stored on a USB jump drive or a compact disc that is inserted into, or otherwise linked with the PC, the PC will automatically execute the installation-trigger logic stored on the wireless communication device (optionally after requesting and receiving user approval). Advantageously, however, the fact that the wireless communication device is equipped to engage in wirelessly communication will enable the wireless communication device to thereafter receive a cancellation command from the network server once the installation is complete.

The invention can be usefully applied to facilitate automated installation of many types of software on a PC or other machine. As presently contemplated, however, one particularly useful application of the invention is to install software on the machine that will allow the machine to interact in a logical way with the wireless communication device itself and/or with the network server.

By way of example, if the wireless communication device is a camera phone and the network server is a photo management server, the software that the installation-logic causes the PC to download and install could be photo management software that will allow the PC to thereafter interact with the camera phone and/or with the photo management server. Such photo-management software, for instance, may allow the PC to interact with the camera phone, to facilitate automated transfer of images between the camera phone and PC. Further, the photo management software may allow the PC to interact with the photo management server, such as to download images previously uploaded by the cameraphone. Other example uses are possible as well.

These as well as other aspects, advantages, and alternatives will become apparent to those of ordinary skill in the art by reading the following detailed description, with reference where appropriate to the accompanying drawings. Further, it should be understood that the foregoing summary and the description provided below are set forth for purposes of example only and that many variations are possible, within the scope of the claims.

DETAILED DESCRIPTION

1. Overview

Figure 1:
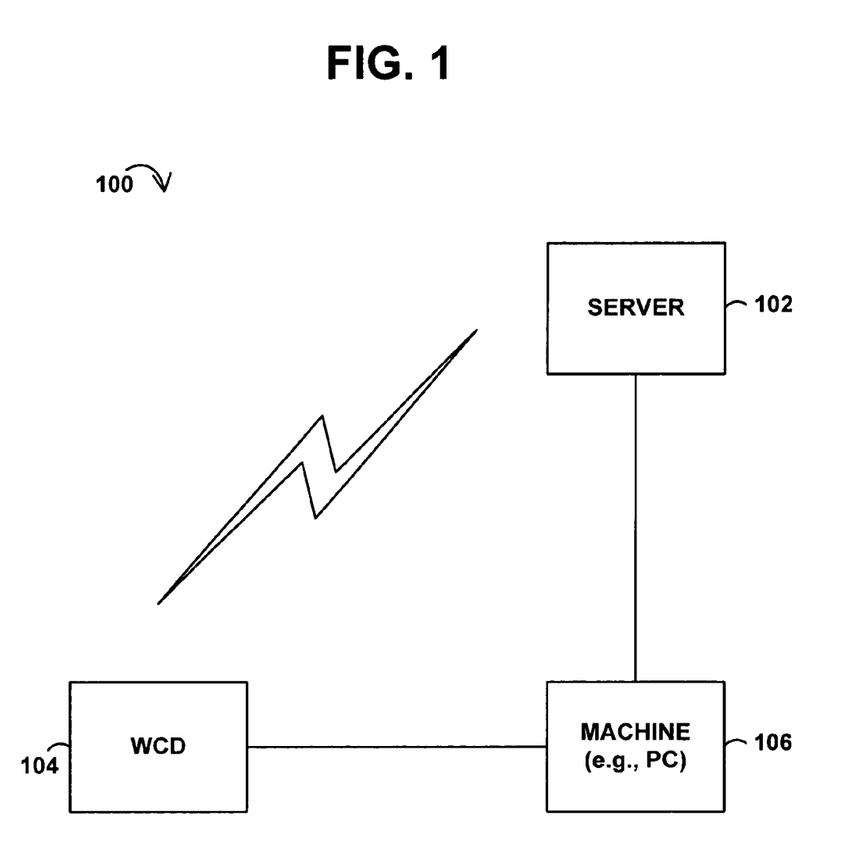
FIG. 1 is a generalized block diagram of a communication network arranged to carry out the exemplary embodiment.

FIG. 1 generally illustrates a communication network 100 in which the exemplary embodiment may be employed. It should be understood, of course, that this and other arrangements and functions described herein are set forth for purposes of example only. As such, those skilled in the art will appreciate that other arrangements and other elements can be used instead, and elements can be added, omitted, combined, distributed, re-ordered, re-positioned, or modified in other ways. Further, various functions described herein as being performed by one or more entities may be carried out by hardware, firmware, and/or software logic. For instance, various functions may be carried out by a processor executing instructions stored in memory.

As shown in FIG. 1, the communication network 100 includes a server 102, a wireless communication device (WCD) 104, and a machine 106. As explained above, the server 102 will send an installation-trigger logic message to the WCD 104, preferably via a radio access network connection to the WCD. (Alternatively, the installation-trigger logic can be provided to the WCD in some other manner, such as during in initial manufacture or provisioning, on the WCD.) The WCD 104 will then be connected with the machine 106, and the machine 106 will automatically execute the installation-trigger logic.

To accomplish this in a preferred embodiment, the installation-trigger logic can be structured to define an "AUTO-RUN" file of the type generally found on mass-storage devices such as USB jump drives for instance, and the WCD 104 can store the installation-trigger logic in a root folder or other predefined location in its data storage. To the extent otherwise necessary, the WCD 104 can be further configured to behave in the same manner that a USB jump drive or other mass-storage drive would behave when coupled with a PC. Consequently, when the WCD 104 is communicatively linked with the machine 106, by a USB cable or other wired or wireless link, the machine will view the WCD 104 as a mass-storage device and will automatically execute the installation-trigger logic.

Pursuant to the installation-trigger logic, the machine 106 will preferably invoke a web browser and download from server 102 (or from another designated network location) a web page that will prompt a user of the machine for authorization to download and install particular software program onto the machine 106. Upon user approval, the machine 106 may then download and install the program. Alternatively, the installation-trigger logic may be executable by the machine 106 to automatically download and install the program without first prompting a user for approval.

Upon completion of installation, the installation-trigger logic or the downloaded program itself will then signal to the server 102 or to another designated server to provide notice that the machine has completed the installation. Alternatively, the act of requesting the software download from the server in the first place may be treated as such notice, constructively assuming that the machine would thereafter install the downloaded software. The notice that the machine provides to the server can take the form of an HTTP message, preferably identifying the WCD and the particular software.

In response to a receipt of the notification from the machine 106, the server 102 will then send a cancellation message to the WCD 104, directing the WCD 104 to delete or otherwise disable the installation-trigger logic from its data storage, and the WCD 104 will do so. The server may, for instance, send the cancellation message in the form of a specially coded SMS message, or in some other form. And the WCD may be programmed to respond to the cancellation message by deleting or otherwise disabling the installation-trigger logic, so that the next time the WCD is linked with the machine, the machine will not again execute the installation-trigger logic.

In an alternative embodiment, note that the software program may already be installed on the machine 106 at the time the WCD 104 becomes communicatively linked with the machine 106. In that case, the machine 106 will preferably still notify the server 102 that the program has been installed. For instance, the installation-trigger logic may direct the machine to first check whether it has the software installed, to download and install it if not yet installed, and to notify the server 102 upon determining that the program is installed. In this scenario as well, when the server 102 receives the notification from the machine, the server would send a cancellation message to the WCD, directing the WCD to delete or otherwise disable the installation-trigger logic.

2. Exemplary Architecture

Figure 2:
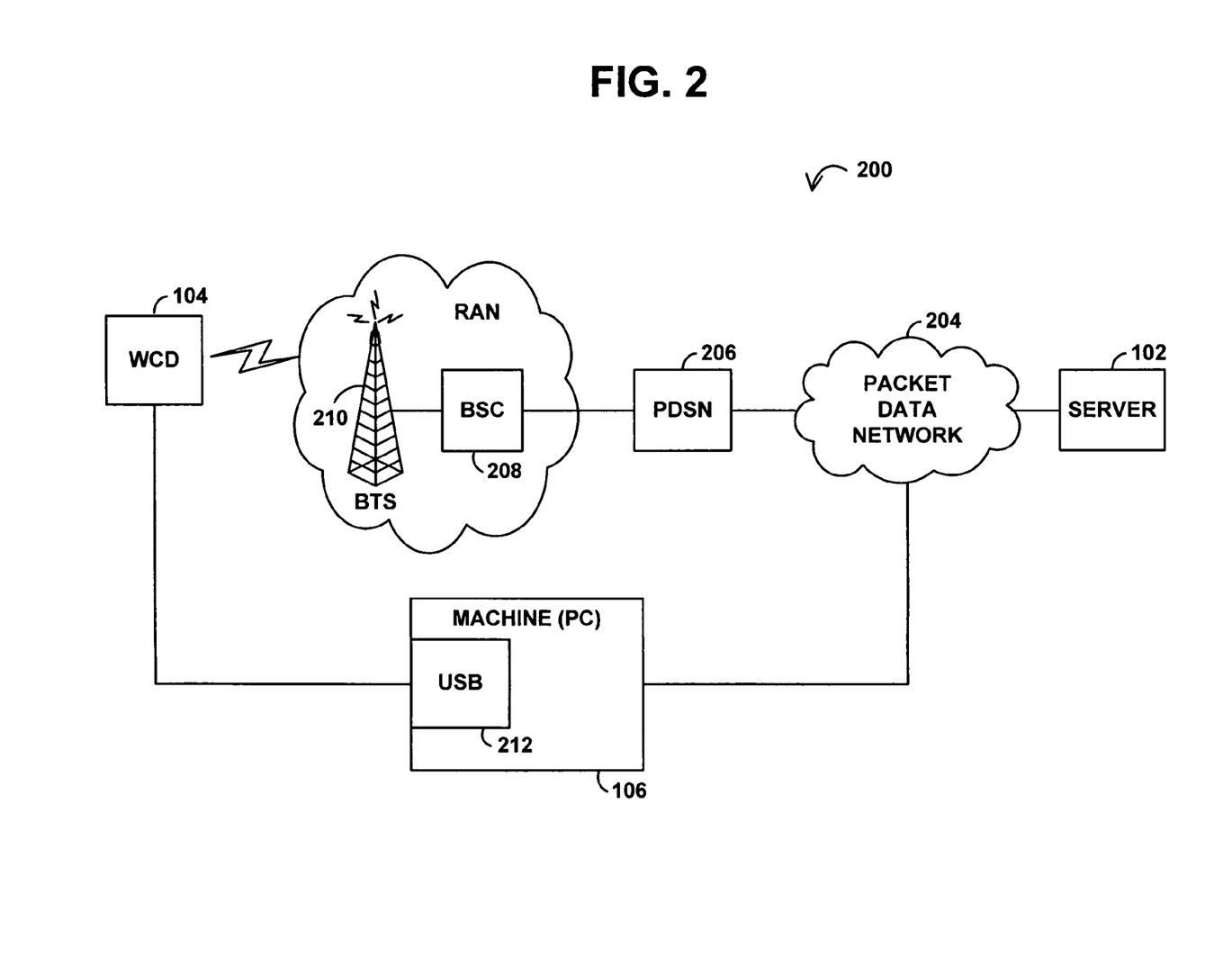
FIG. 2 is another block diagram of communication network in which the exemplary embodiment can be implemented.

Referring next to FIG. 2, a simplified block diagram of a communication network 200 is shown to more particularly illustrate a preferred arrangement of the entities shown in FIG. 1. The example network 200 of FIG. 2 includes the server 102, WCD 104, and machine 106 of FIG. 1. In the preferred arrangement as shown, WCD 104 is communicatively linked by a radio access network 202 with a packet-data network 204 that provides connectivity with server 102. Network 204 may, for instance, be the Internet or one or more other public and/or private packet-switched networks operating according to the well known Internet Protocol.

WCD 104 is preferably a cellular wireless communication device, such as a cell phone or wirelessly equipped PDA or personal computer for instance. In a particularly preferred embodiment as will be described more below, WCD 104 can be a camera phone or a digital camera that is otherwise equipped to engage in wireless packet-data communication, so at so facilitate convenient online management and sharing of images (or video) captured by the camera.

Radio access network is shown to include a base transceiver station (BTS) 210, which radiates to define a wireless coverage area in which WCD 104 can operate. BTS 210 is then coupled with a base station controller (BSC) 208, which controls BTS 210 and generally governs air interface communications between WCD 104 and BTS 210. BSC 208 is then coupled with a packet data serving node (PDSN), which functions as a network access server, providing connectivity with packet-data network 204.

In a manner well known in the art, WCD 104 may be arranged to engage in wireless packet-data communication via RAN 202 with entities on packet-data network 204, such as with server 102 for instance. For instance, WCD 104 may employ CDMA2000 or another wireless packet-data connectivity mechanism, sending a packet-data origination request over the air to RAN 202, and responsively acquiring an radio link, data link, and IP address to facilitate packet-data communication. Further, WCD 104 may be programmed to receive and respond to short-messaging-service (SMS) messages, multimedia-messaging-service (MMS) messages or other sorts of messages, through which WCD 104 may receive content, such as the installation-trigger logic and cancellation message presently contemplated.

Server 102 may take the form of one or more computer servers of a form generally known in the art, but programmed with logic as described herein. In a preferred embodiment, sever 102 will include web server functionality, to be able to receive and respond to HTTP or other such requests by delivering content such as predefined web pages to requesting clients. Server 102 will also preferably be programmed to manage delivery of installation-trigger logic and cancellation messages to devices such as WCD 104, and receipt of installation acknowledgement messages from machines such as machine 106. In a particularly preferred embodiment, server 102 is a photo management server of the type mentioned above and functions to interact with cameraphones and other media devices over network connections.

Machine 106 is next shown sitting as a node on packet-data network 204. Machine 106 may be connected to network 204 through a local area network or through one or more other links, whether wired and/or wireless. In one embodiment, for instance, machine 106 could be coupled with network 204 by WCD 104, using WCD 104 as a wireless data modem. Other connection mechanisms are possible as well.

Machine 106 is preferably a PC with a generally well known configuration. However, as noted above, machine 106 can take other forms as well. For example, machine 106 could be a set top box, a television, a smart appliance such as a network-connected refrigerator or washing machine, or some other sort of machine now known or later developed.

As illustrated generally in FIG. 2, machine 106 includes a USB port 212 to which WCD 104 can be connected in accordance with the exemplary embodiment. USB is used here as merely one well known example of a connection mechanism. Thus, it should be understood that machine 106 can be equipped to communicate with WCD 104 in other ways instead (or in addition), such as through an IEEE 1394 interface, a BLUETOOTH wireless interface, an infrared link, a radio frequency link, or in any other manner. Note also that, while FIG. 2 illustrates an existing link between WCD 104 and machine 106, it is preferably the establishment of this link that will cause the machine 106 to read and execute the installation-trigger logic as presently contemplated.

Figure 3:
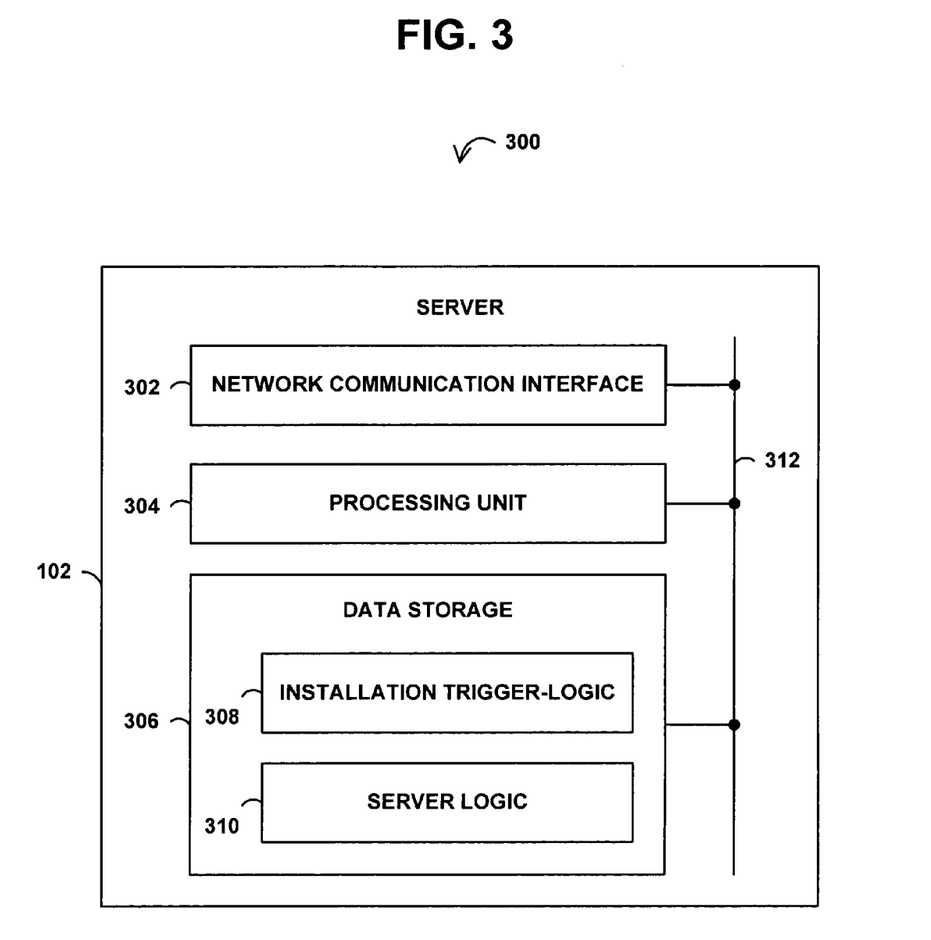
FIG. 3 is a simplified block diagram of a server operable within the exemplary embodiment.

FIG. 3 is a simplified block diagram showing functional components of an exemplary server 104. As shown in FIG. 3, the exemplary server 104 includes a network communication interface 302, a processing unit 304, and data storage 308, all of which may be coupled together by a system bus, network or other mechanism 312.

The network communication interface 302 may be an Ethernet network communication module of a type well known in the art, facilitating connectivity with packet-data network 204. Although not shown, network communication interface (or another such interface) may also be coupled with an SS7 signaling network or other sort of signaling network through which server 102 can push SMS messages, MMS messages, or content to devices such as WCD 104. The server 102 can use such a mechanism (e.g., MMS messaging or, more generally, WAP push messaging) to deliver installation-trigger logic and cancellation messages to such devices. Alternatively, the server may deliver installation-trigger logic and/or cancellation messages in some other manner.

The processing unit 304 may comprise one or more general purpose processors (such as INTEL microprocessors) and/or one or more special purpose processors. The data storage 306, in turn, may comprise one or more volatile and/or non-volatile storage components, and may be integrated in whole or in part with processing unit 304.

Data storage 306 preferably contains installation-trigger logic 308 and server logic 310. The installation-trigger logic 308 comprises the installation-trigger logic described above, which server 102 will deliver to WCD 104 for storage by WCD 104 and execution by machine 106. As further noted above, the installation-trigger logic may take the form of an AUTORUN program that comprises an associated link to a program-download web page. More particularly, the AUTORUN program may include a set of batch commands, including a command for machine 106 to invoke a web browser and to request the designated web page and/or for machine 106 to automatically download the software program, a command for machine 106 to install the program after downloading it, and a command for machine 106 to send a notification message to server 102 after installing the program or after determining that the program is already installed. It should be understood that an AUTORUN program is just one example of installation-trigger logic 308, and that other examples are possible as well.

The server logic 310, on the other hand, preferably comprises machine language instructions executable by processing unit 304 to carry out various functions described herein. In particular, the server logic 310 may be executable by processing unit 304 to carry out functions including (i) sending the installation-trigger logic to WCD 104, in response to a designated trigger event, such as receipt of a signal from a provisioning server (not shown) for instance, (ii) receipt of a request from machine 106 for a program-download web page, (iii) transmission of a predefined program-download web page in response to such a request, (iv) receipt of an installation notification message from machine 106, and (v) transmission of a cancellation message to WCD 104 in response to the installation notification message.

In the preferred embodiment, when server 102 sends the installation-trigger logic to WCD 104, server 102 will include with the installation-trigger logic an identifier uniquely associated with the WCD 104 (e.g., a mobile identification number, electronic serial number, network access identifier, or other identifier), such as by encrypting or otherwise encoding the identifier within the installation-trigger logic itself. Further, if necessary, the server 102 will maintain a record of that identifier, and particularly an association of the identifier with the WCD 104. Preferably, when machine 106 sends its installation notice to the server, the installation-trigger logic will cause the machine to include the identifier in that notice. Thus, when the server receives the installation notice, the server can then programmatically identify the WCD 104 to which the server should send a cancellation notice.

Figure 4:
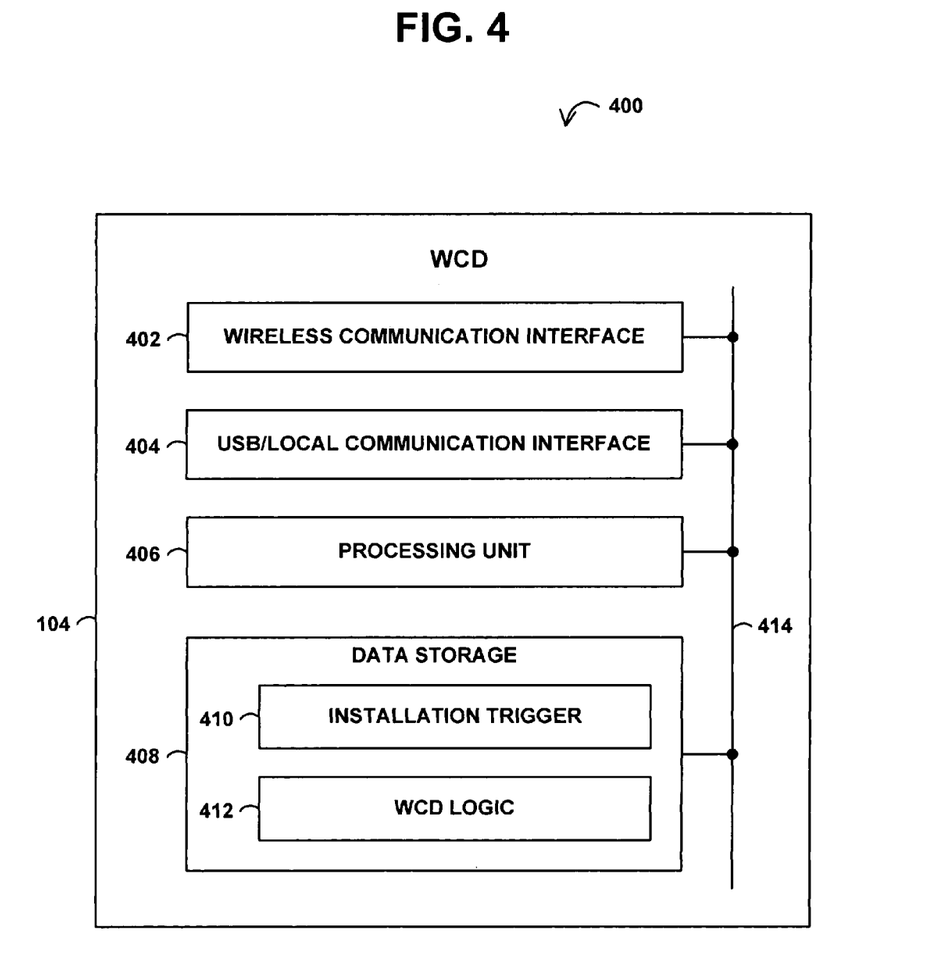
FIG. 4 is simplified block diagram of a wireless communication device operable within the exemplary embodiment.

FIG. 4 is next a simplified block diagram showing functional components of an exemplary WCD 104. As shown in FIG. 4, the exemplary WCD 104 includes a wireless communication interface 402, a USB or other local communication interface 404, a processing unit 406, and data storage 408, all of which may be coupled together by a system bus, network or other mechanism 414.

The wireless communication interface 402 may include a chipset such as an MSM series chipset available from Qualcomm Inc., for instance, that facilitates cellular wireless communication, including, preferably, wireless packet data communication and SMS or other wireless data burst communication. Wireless communication interface 402 also preferably includes an antenna (not shown) to facilitate such wireless communication over an air interface with RAN 202 in a manner well known in the art.

The USB interface 404 preferably comprises a USB port to which a USB cable can be connected for coupling the WCD 104 with the machine 106. As noted above, other local communication links could be provided instead (or in addition).

The processing unit 406 may comprise one or more general purpose processors (such as INTEL microprocessors) and/or one or more special purpose processors. The data storage 408, in turn, may comprise one or more volatile and/or non-volatile storage components, and may be integrated in whole or in part with processing unit 406.

Data storage 408 is shown containing installation-trigger logic 410, which WCD 104 has received from sever. Installation-trigger logic 410 may thus be identical to installation-trigger logic 308 or may differ in some manner, such as by including the identifier that server 102 provided specifically for WCD 104.

Data storage 408 further contains WCD logic 412, which preferably comprises machine language instructions executable by processing unit 406 to carry out various functions described herein. In particular, the WCD logic 412 may be executable by processing unit 406 to carry out functions including (i) receive and store as an AUTORUN file the installation-trigger logic provided by server 102, (ii) receive a cancellation message provided by server 102, and (iii) respond to the cancellation message by deleting or otherwise disabling the installation-trigger logic.

As noted above, both the installation-trigger logic and the cancellation message can be provided to WCD 104 through SMS or MMS messaging or in some other manner now known or later developed. WCD logic 412 may thus comprise message-management logic that monitors incoming SMS or MMS messages and, (i) in response to such a message carrying installation-trigger logic, stores the installation-trigger logic as an AUTORUN file, or (ii) in response to such a message carrying a cancellation instruction, deletes or otherwise disables previously stored installation-trigger logic. The WCD can disable installation-trigger logic by flagging the logic as inactive or by hiding the logic in data storage 408.

Figure 5:
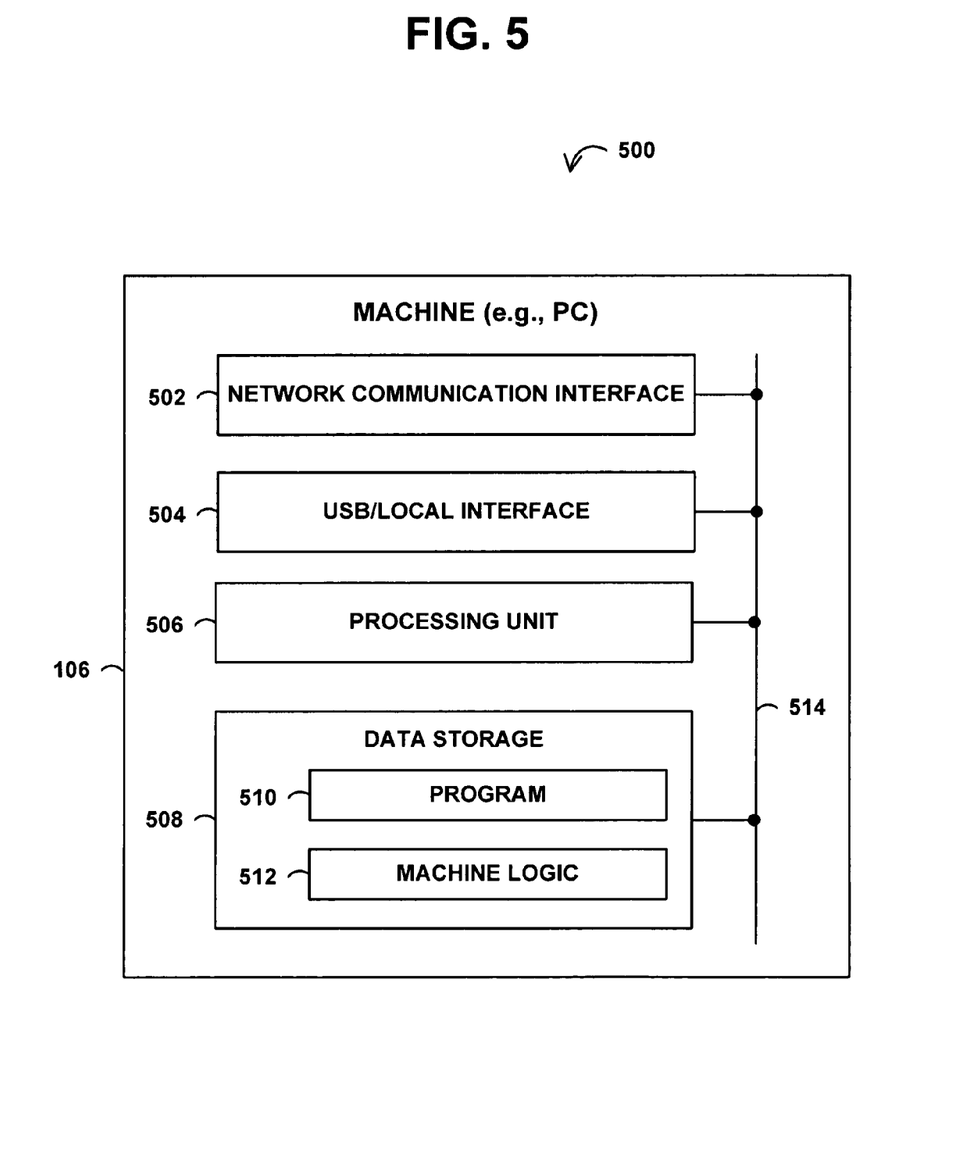
FIG. 5 is a simplified block diagram of a machine, such as a PC, operable within the exemplary embodiment.

FIG. 5 is next a simplified block diagram showing functional components of an exemplary machine 106. As shown in FIG. 5, the exemplary machine 106 includes a network communication interface 502, a USB or other local communication interface 504, a processing unit 506, and data storage 508, all of which may be coupled together by a system bus, network or other mechanism 514.

The network communication interface 502 may be an Ethernet network communication module of a type well known in the art, facilitating connectivity with packet-data network 204. The processing unit 506 may comprise one or more general purpose processors (such as INTEL microprocessors) and/or one or more special purpose processors. The data storage 508, in turn, may comprise one or more volatile and/or non-volatile storage components, and may be integrated in whole or in part with processing unit 506.

Data storage 508 is shown containing an installed program 510, which machine 106 has preferably downloaded and installed in the manner described herein. Data storage further contains machine logic 512, which is executable by processing unit 506 to carry out various machine functions as described. The functions of machine logic 512 may include: (i) detecting when WCD 104 is connected to the machine by the USB interface, in the same manner that a PC would detect connection of any mass storage device, and (ii) reading and executing the installation-trigger logic, just as a PC would normally read and execute an AUTORUN file or the like on a connected mass-storage device.

Further, the machine logic 512 will preferably define a web browser that the machine 106 will invoke pursuant to the installation-trigger logic to download a software-download web page or to directly download the software program 510. If the machine 106 downloads a software-download web page, the machine 106 may then present the page to a user to inform the user that the software program is available to be downloaded. Upon user authorization, the machine may then download and install the program. Still further, the machine logic 512 will preferably include an installation function that can be invoked by the installation-trigger logic, by the downloaded program, or in some other manner, to install the program onto the machine.

3. Exemplary Operation

Figure 6:
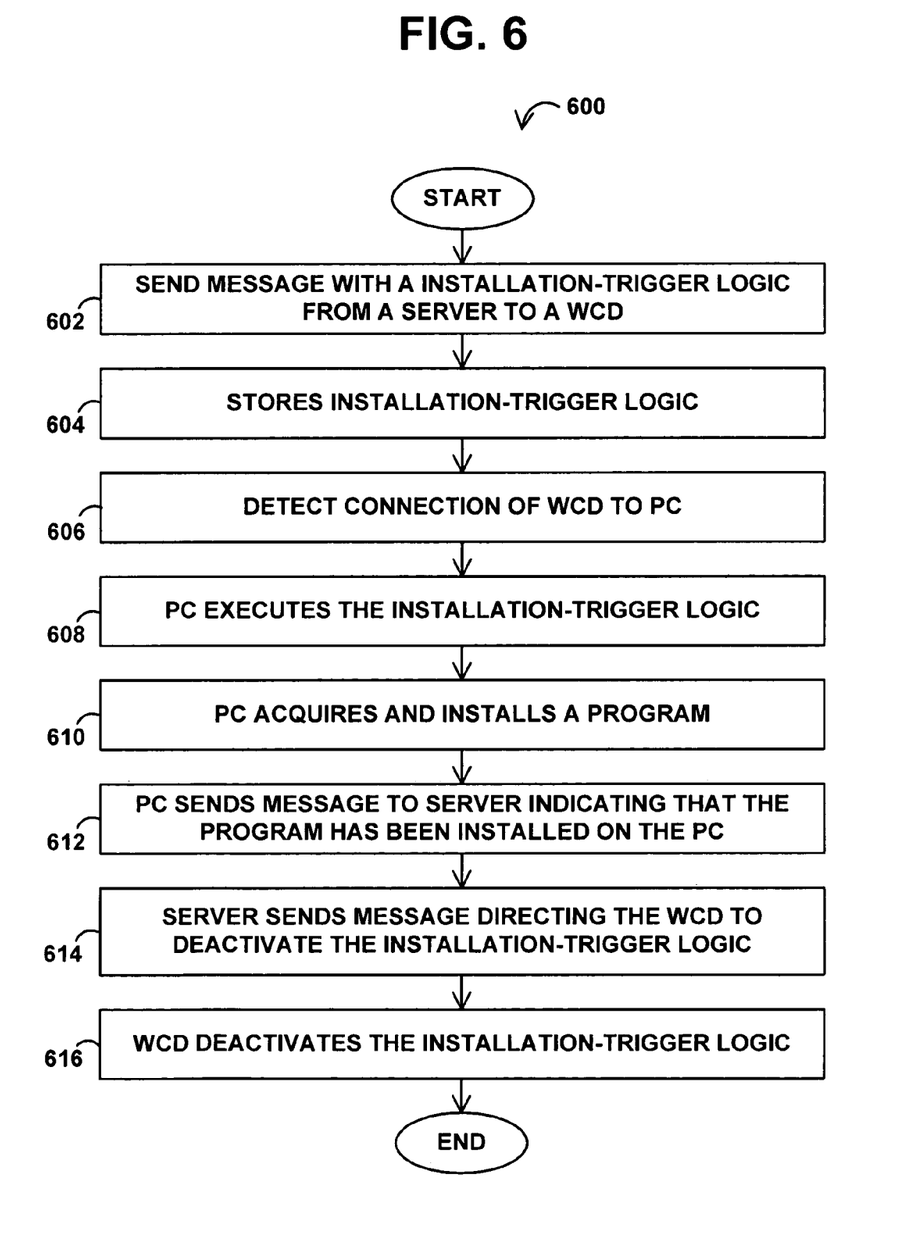
FIG. 6 is a flow chart of functions that can be carried out in accordance with the exemplary embodiment.

Referring next to FIG. 6, a generalized flow chart 600 illustrating functions carried out in accordance with the exemplary embodiment is provided. The flow chart uses a PC as the example machine 106.

As shown in FIG. 6, at step 602, the process starts with the server 102 sending over an air interface to WCD 104 a first message that includes installation-trigger logic 308, 410, preferably including an the WCD identifier as well as an identifier of the installation-trigger logic itself.

Preferably, the server 102 will use MMS messaging to send the installation-trigger logic to the WCD 104. To do so, the server may send the installation-trigger logic to an MMS controller (MMSC) (not shown). The MMSC may then store the installation-trigger logic and send a specially encoded SMS message to the WCD, providing in the SMS message a URL that designates where the MMSC stored the installation-trigger logic. Autonomously, or upon user approval, the WCD may then acquire packet-data connectivity and engage in HTTP communication to download the installation-trigger logic from the designated URL. Alternatively, another messaging system could be used instead.

At step 604, the WCD 104 receives the installation-trigger logic and stores the installation-trigger logic in the data storage 408. As noted above, the WCD preferably stores the installation-trigger logic in a root of its data storage or in some other location where the PC 106 will expect to find the installation-trigger logic.

At step 606, the PC 106 detects a connection of the WCD 104 to the PC. For instance, if the connection is made via USB, the PC may detect connection of the WCD in the same manner that a PC normally detects connection of a USB mass-storage drive. In particular, the PC may employ well known plug-and-play technology to detect the connection of the WCD.

At step 608, treating the WCD as a mass storage device, the PC 106 reads and executes the installation-trigger logic 410 (e.g., AUTORUN program). Upon execution, at step 610, the installation-trigger logic 410 may cause the PC 106 to download and install a designated software program. In this regard, the installation-trigger logic can cause the PC 106 to first download a software-download web page, which the PC would present to a user, and, upon user approval, the PC would then download software designated by the web page and install the software. Further, the installation-trigger logic can cause the PC to first check its program registry to determine whether the program is already installed and, if so, to go directly to the next step.

At step 612, upon completion of installation, the PC 106 sends message (e.g., an HTTP message) to the server 102 indicating that the program 510 has been installed on the PC 106. The installation-trigger logic 410 and/or the downloaded program 510 may direct the PC 106 to send this notification message to the server 102. As noted above, the notification message will preferably carry the WCD identifier. Note that, in an alternative embodiment, the notification message can instead be sent to another designated server (in which case the other designated server would then send, or cause to be sent, the cancellation message to the WCD).

At step 614, upon receipt of the notification message from the PC 106, the server 102 responsively sends a cancellation message to the WCD 104. As noted above, the server 102 may send the cancellation message to the WCD as a specially coded SMS message or in some other desired form. The server may use the WCD identifier provided in the notification message to determine where to send the cancellation message.

At step 616, upon receipt of the cancellation message, the WCD 104 deletes or otherwise disables or deactivates the installation-trigger logic 408 that was stored in its data storage 408. In a preferred embodiment, the cancellation message may carry an indication of the specific installation-trigger logic to be cancelled, so that WCD 104 can delete or otherwise disable the applicable logic.

4. Examples

As noted above, the invention can be especially useful to assist in installing onto machine 106 a software program that relates in some way to WCD 104. A photo-management program is an example of such a software program, particularly in a scenario where WCD 104 is a camera phone.

In operation, after a user purchases a camera phone and signs up with a wireless carrier for photo management service (e.g., establishing an account with the wireless carrier's photo management server), the photo management server (functioning as server 102) may transmit to the user's camera phone (functioning as WCD 104) a small installation-trigger logic module. When the user then connects the camera phone by USB or in some other manner to the user's PC (functioning as machine 106), the PC would view the camera phone as a mass storage device and would execute the installation-trigger logic.

Pursuant to the installation-trigger logic, the PC may then download from the photo management server a photo-management application and install the application. The PC may then send an installation notification message to the photo management server, and the photo management server may responsively send a cancellation message to the user's camera phone, to prevent the process from repeating the next time the camera phone is connected to the PC.

Conveniently, the photo management program thus installed on the user's PC may include program functions to allow easy transfer of photos between the camera phone and the PC. Further, the photo management program may include program functions to allow easy interaction with the photo management server, so as to allow the user to view and otherwise manage photos that the user uploaded to the photo management server from the user's camera phone.

As another example, when WCD 104 is connected with PC 106, the software program that machine 106 downloads pursuant to the installation-trigger logic can be a program that functions in part set up a special form of communication between the PC and the WCD. For example, the program, or installation of the program, can function to configure the PC with one or more settings that cause the PC to recognize the WCD as a wireless data modem, so that the PC can then engage in communication on network 204 via WCD 104. More particularly, the program, or installation of the program, could set up the WCD as a BLUETOOTH or other wirelessly-connected modem (such as by providing the PC with a BLUETOOTH passkey associated with the WCD), or as a more conventionally connected data modem.

5. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
sending over an air interface to a wireless communication device (WCD) a set of installation-trigger logic for the WCD to pass to a machine, wherein the installation-trigger logic is executable by the machine to initiate installation of a program on the machine;
thereafter receiving from the machine a signal indicating that the machine has installed the program; and
responsive to the signal, sending to the WCD a directive to deactivate the installation-trigger logic;
wherein the installation-trigger logic comprises a command with an associated link to a program-download web page, the method further comprising, at the machine:
detecting attachment of the WCD to the machine;
pursuant to the command, invoking a web browser and downloading the program-download web page;
presenting the program-download web page to a user, wherein the program-download web page prompts the user to approve download of the program;
receiving user approval to download the program, and responsively downloading the program;
installing the downloading program; and
further comprising sending from the machine to a server the signal indicating that the machine has installed the program.

2. The method of claim 1, wherein the WCD comprises a device selected from the group consisting of a cell phone, a wirelessly-equipped personal digital assistant, and a wirelessly-equipped personal computer.

3. The method of claim 1, wherein sending the installation-trigger logic over the air interface to the WCD comprises sending the installation-trigger logic to the WCD via Wireless Application Protocol (WAP) Push.

4. The method of claim 1, wherein the air interface comprises a Code Division Multiple Access (CDMA) air interface.

5. The method of claim 1, wherein the machine comprises a personal computer.

6. The method of claim 1, further comprising: receiving the installation-trigger logic into WCD; and storing the installation-trigger logic in data storage of the WCD.

7. The method of claim 6, further comprising: providing the installation-trigger logic from the WCD to the machine.

8. The method of claim 6, wherein the directive to deactivate the installation-trigger logic comprises an instruction for the WCD to erase the installation-trigger logic from the data storage, the method further comprising:
erasing the installation-trigger logic from the data storage in response to the directive.

9. The method of claim 1, wherein the installation of the program on the machine comprises configuring the machine with one or more settings to enable communication between the machine and the WCD.

10. The method of claim 9, wherein configuring the machine with one or more settings to enable communication between the machine and the WCD comprises configuring the machine with one or more settings to enable the machine to use the WCD as a modem.

11. The method of claim 10, wherein configuring the machine with one or more settings to enable the machine to use the WCD as a modem comprises configuring the machine with one or more settings to enable the machine to use the WCD as a wirelessly-connected modem.

12. The method of claim 1, further comprising, after sending the installation-trigger logic to the WCD:

downloading and installing the program on the machine without the machine first receiving the installation-trigger logic from the WCD; and sending from the machine to the server the signal indicating that the machine has installed the program.

13. The method of the claim 1, wherein the WCD is a wirelessly-equipped digital camera, and wherein the program is a photo-management program.

14. The method of claim 13, wherein the WCD is a camera phone.

15. A method comprising:

sending from a server via an air interface to a camera phone a first message that defines installation-trigger logic;

wirelessly receiving the first message at the camera phone, and storing the installation-trigger logic in the camera phone;

detecting connection of the camera phone with a personal computer, and the personal computer responsively executing the installation-trigger logic and thereby acquiring and installing a photo management program;

sending from the personal computer to the server a second message indicating that the personal computer has installed the program;

receiving the second message at the server, and responsively sending from the server to the camera phone a third message that directs the camera phone to deactivate the installation-trigger logic; and deactivating the installation-trigger logic at the camera phone in response to the third message;

wherein the installation-trigger logic comprises a command with an associated link to a program-download web page, the method further comprising, at the personal computer:

detecting attachment of the camera phone to the personal computer;

pursuant to the command, invoking a web browser and downloading the program-download web page;

presenting the program-download web page to a user, wherein the program-download web page prompts the user to approve download of the program;

receiving user approval to download the program, and responsively downloading the program; and installing the downloading program;

further comprising sending from the personal computer to a server the signal indicating that the personal computer has installed the program.

16. A system comprising:

a network communication interface;

a processor;

data storage;

program instruction stored in the data storage and executable by the processor to perform functions comprising:

transmitting via the network communication interface to a first machine a set of installation-trigger logic for the first machine to pass to a second machine, wherein the installation-trigger logic is executable by the second machine to initiate installation of a program on the second machine;

thereafter receiving via the network communication interface from the second machine a signal indicating that the second machine has installed the program; and responsive to the signal, sending via the network communication interface to the first machine a directive for the first machine to deactivate the installation-trigger logic;

wherein the installation-trigger logic comprises a command with an associated link to a program-download web page, the method further comprising, at the second machine:

detecting attachment of the first machine to the second machine;

pursuant to the command, invoking a web browser and downloading the program-download web page;

presenting the program-download web page to a user, wherein the program-download web page prompts the user to approve download of the program;

receiving user approval to download the program, and responsively downloading the program; and installing the downloading program further comprising sending from the second machine to a server the signal indicating that the second machine has installed the program.

17. The system of claim 16, wherein the first machine is a wireless communication device, and wherein the function of transmitting the installation-trigger logic to the first machine comprises transmitting the installation-trigger logic to the first machine via an air interface.

18. The system of claim 16, wherein the first machine is a camera phone, wherein the second machine is a personal computer, and wherein the program is a photo-management program.

* * * * *